United States Patent
Lunden et al.

(10) Patent No.: US 9,781,764 B2
(45) Date of Patent: Oct. 3, 2017

(54) RADIO RESOURCE CONTROL (RRC) CONNECTION RE-ESTABLISHMENT

(71) Applicant: Nokia Technologies Oy, Espoo (FI)

(72) Inventors: Petteri Lunden, Espoo (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 343 days.

(21) Appl. No.: 14/493,088

(22) Filed: Sep. 22, 2014

(65) Prior Publication Data
US 2015/0085798 A1 Mar. 26, 2015

Related U.S. Application Data

(60) Provisional application No. 61/882,887, filed on Sep. 26, 2013.

(51) Int. Cl.
*H04W 48/14* (2009.01)
*H04W 76/02* (2009.01)
*H04W 36/00* (2009.01)

(52) U.S. Cl.
CPC ...... *H04W 76/028* (2013.01); *H04W 36/0061* (2013.01)

(58) Field of Classification Search
None
See application file for complete search history.

(56) References Cited

U.S. PATENT DOCUMENTS

| 2010/0317345 A1* | 12/2010 | Futaki | H04W 36/0055 455/436 |
| 2011/0207485 A1 | 8/2011 | Dimou et al. | |
| 2012/0257522 A1* | 10/2012 | Adachi | H04W 76/048 370/252 |
| 2012/0289231 A1* | 11/2012 | Balachandran | H04W 76/025 455/436 |

(Continued)

FOREIGN PATENT DOCUMENTS

EP 2117277 A1 11/2009

OTHER PUBLICATIONS

"New WI Proposal: Hetnet Mobility Enhancements for LTE", 3GPP TSG-RAN Meeting #58, RP-122007, Agenda Item: 13.1, Source: Alcatel-Lucent, Alcatel-Lucent Shanghai Bell, Dec. 4-7, 2012, 5 pages.

(Continued)

*Primary Examiner* — Fan Ng
(74) *Attorney, Agent, or Firm* — Harrington & Smith

(57) ABSTRACT

Systems, methods, apparatuses, and computer program products for a radio resource control connection re-establishment for a wireless system, such as LTE and LTE-A, are provided. One method comprises determining a strongest signal strength cell to a user equipment and comparing the strongest signal strength cell to a list of prepared cells. The method further comprises determining if the strongest signal strength cell is a suitable cell and if it is on the list of prepared cells. The method may further comprise, upon a connection failure, the user equipment attempting re-estab- (Continued)

lishment connection between the user equipment and the strongest signal strength cell if the strongest signal strength cell is a suitable cell and is on the list of prepared cells.

20 Claims, 4 Drawing Sheets

(56) References Cited

U.S. PATENT DOCUMENTS

| | | | | |
|---|---|---|---|---|
| 2013/0053042 A1* | 2/2013 | Tanikawa | ............... | H04W 36/32 455/437 |
| 2014/0011502 A1* | 1/2014 | Moilanen | .......... | H04W 36/0061 455/437 |
| 2014/0018085 A1* | 1/2014 | Young | ............... | H04W 52/0235 455/450 |
| 2014/0038616 A1* | 2/2014 | Burbidge | .............. | H04W 36/18 455/442 |
| 2015/0215830 A1* | 7/2015 | Dalsgaard | ......... | H04W 36/0094 455/444 |

OTHER PUBLICATIONS

"Re-Establishment Enhancements for HetNet", 3GPP TSG-RAN WG2 Meeting #83, R2-132846, Agenda item: 7.1.3, Source: NSN, Nokia Corporation, Aug. 19-23, 2013, 6 pages.

"3rd Generation Partnership Project; Technical Specification Group Radio Access Network; Evolved Universal Terrestrial Radio Access (E-UTRA); User Equipment (UE) Procedures in Idle Mode (Release 11)", 3GPP TS 36.304, v11.5.0, Sep. 2013, pp. 1-34.

"Further Evaluation of Mobility Performance in LTE", 3GPP TSG-RAN WG1 #56bis, R1-091446, Agenda item: 13, Qualcomm Europe, Mar. 23-27, 2009, pp. 1-6.

"Way Forward for Hetnet Re-establishment Enhancements", 3GPP TSG-RAN WG2 Meeting #84, R2-134097, Agenda item: 7.1.3.2, NSN, Nov. 11-15, 2013, 5 pages.

Extended European Search Report received for corresponding European Patent Application No. 14185703.7, dated Mar. 4, 2015, 9 pages.

* cited by examiner

RADIO RESOURCE CONTROL (RRC) CONNECTION RE-ESTABLISHMENT

BACKGROUND

Technical Field

The exemplary and non-limiting embodiments relate generally to wireless communications and, more particularly, to radio communications.

SUMMARY

One embodiment is directed to a method including determining a strongest signal strength cell to a user equipment and comparing the strongest signal strength cell to a list of prepared cells. The method may further comprise determining if the strongest signal strength cell is a suitable cell. The method may also further comprise determining if the strongest signal strength cell is on the list of prepared cells. The method may further comprise, upon a connection failure, the user equipment attempting re-establishment of connection between the user equipment and the strongest signal strength cell if the strongest signal strength cell is a suitable cell and is on the list of prepared cells.

Another embodiment is directed to an apparatus including at least one processor and at least one memory including computer program code. The at least one memory and computer program code are configured, with the at least one processor, to cause the apparatus at least to determine a strongest signal strength cell to a user equipment and compare the strongest signal strength cell to a list of prepared cells. The apparatus, in which the at least one memory and computer program code may further configured with the at least one data processor to further cause the apparatus to determine if the strongest signal strength cell is a suitable cell. The apparatus, in which the at least one memory and computer program code may further configured with the at least one data processor to further cause the apparatus to determine if the strongest signal strength cell is on the list of prepared cells. The apparatus, in which the at least one memory and computer program code may further configured with the at least one data processor to further cause the apparatus, upon a connection failure, to attempt re-establishment of connection between the user equipment and the strongest signal strength cell if the strongest signal strength cell is a suitable cell and is on the list of prepared cells.

Another embodiment is directed to a method including comparing a plurality of cells to a list of prepared cells, where a user equipment is connected to a wireless communications system having the cells, determining a strongest signal strength cell to the user equipment, determining if one or more of the plurality of cells is a suitable cell and determining if the suitable cell of the one or more of the plurality of cells has a signal strength which is weaker than the signal strength of the strongest signal strength cell. The method may further comprises attempting re-establishment of connection between the user equipment and the suitable cell of the one or more of the plurality of cells, if the suitable cell is on the list of prepared cells and if the suitable cell has a signal strength weaker than the signal strength of the strongest signal strength cell by at most a threshold amount.

Another embodiment is directed to a method including comparing a plurality of cells to a list of prepared cells, where a user equipment is connected to a wireless communications system having the cells, determining a strongest signal strength cell to the user equipment, determining if one or more of the plurality of cells is a suitable cell and determining if the suitable cell of the one or more of the plurality of cells has a signal strength which is weaker than the signal strength of the strongest signal strength cell. The method may further comprises attempting re-establishment of connection between the user equipment and the strongest signal strength cell, if the one or more of the plurality of cells is not a suitable cell or if the suitable cell of the one or more of the plurality of cells has a signal strength weaker than the signal strength of the strongest signal strength cell by more than a threshold amount.

Another embodiment is directed to an apparatus including at least one processor and at least one memory including computer program code. The at least one memory and computer program code are configured, with the at least one processor, to cause the apparatus at least to compare a plurality of cells to a list of prepared cells, where a user equipment is connected to a wireless communications system having the cells, determine a strongest signal strength cell to the user equipment, determine if one or more of the plurality of cells is a suitable cell and determine if the suitable cell of the one or more of the plurality of cells has a signal strength which is weaker than the signal strength of the strongest signal strength cell. The apparatus, in which the at least one memory and computer program code may further configured with the at least one data processor to further cause the apparatus to attempt re-establishment of connection between the user equipment and the suitable cell of the one or more of the plurality of cells, if the suitable cell is on the list of prepared cells and if the suitable cell has a signal strength weaker than the signal strength of the strongest signal strength cell by at most a threshold amount.

Another embodiment is directed to an apparatus including at least one processor and at least one memory including computer program code. The at least one memory and computer program code are configured, with the at least one processor, to cause the apparatus at least to compare a plurality of cells to a list of prepared cells, where a user equipment is connected to a wireless communications system having the cells, determine a strongest signal strength cell to the user equipment, determine if one or more of the plurality of cells is a suitable cell and determine if the suitable cell of the one or more of the plurality of cells has a signal strength which is weaker than the signal strength of the strongest signal strength cell. The apparatus, in which the at least one memory and computer program code may further configured with the at least one data processor to further cause the apparatus to attempt re-establishment of connection between the user equipment and the strongest signal strength cell, if the one or more of the plurality of cells is not a suitable cell or if the suitable cell of the one or more of the plurality of cells has a signal strength weaker than the signal strength of the strongest signal strength cell by more than a threshold amount.

Another embodiment is directed to a method including comparing a first cell to a list of prepared cells, where a user equipment is connected to a wireless communications system having the first cell and re-establishing connection of the user equipment via the first cell unless there is a second cell on a same carrier which has a stronger signal strength with the user equipment than the first cell by at least a threshold value, when the first cell is on the list of prepared cells, and when there is a communications failure between the user equipment and the wireless communications system.

Another embodiment is directed to an apparatus including at least one processor and at least one memory including computer program code. The at least one memory and computer program code are configured, with the at least one processor, to cause the apparatus at least to compare a first cell to a list of prepared cells, where a user equipment is connected to a wireless communications system having the first cell and re-establish connection of the user equipment via the first cell unless there is a second cell on a same carrier which has a stronger signal strength with the user equipment than the first cell by at least a threshold value, when the first cell is on the list of prepared cells, and when there is a communications failure between the user equipment and the wireless communications system.

BRIEF DESCRIPTION OF THE DRAWINGS

The foregoing and other aspects of exemplary embodiments are made more evident in the following Detailed Description of Embodiment, when read in conjunction with the attached Drawing Figures, wherein.

DETAILED DESCRIPTION OF EMBODIMENT

Figure 1:
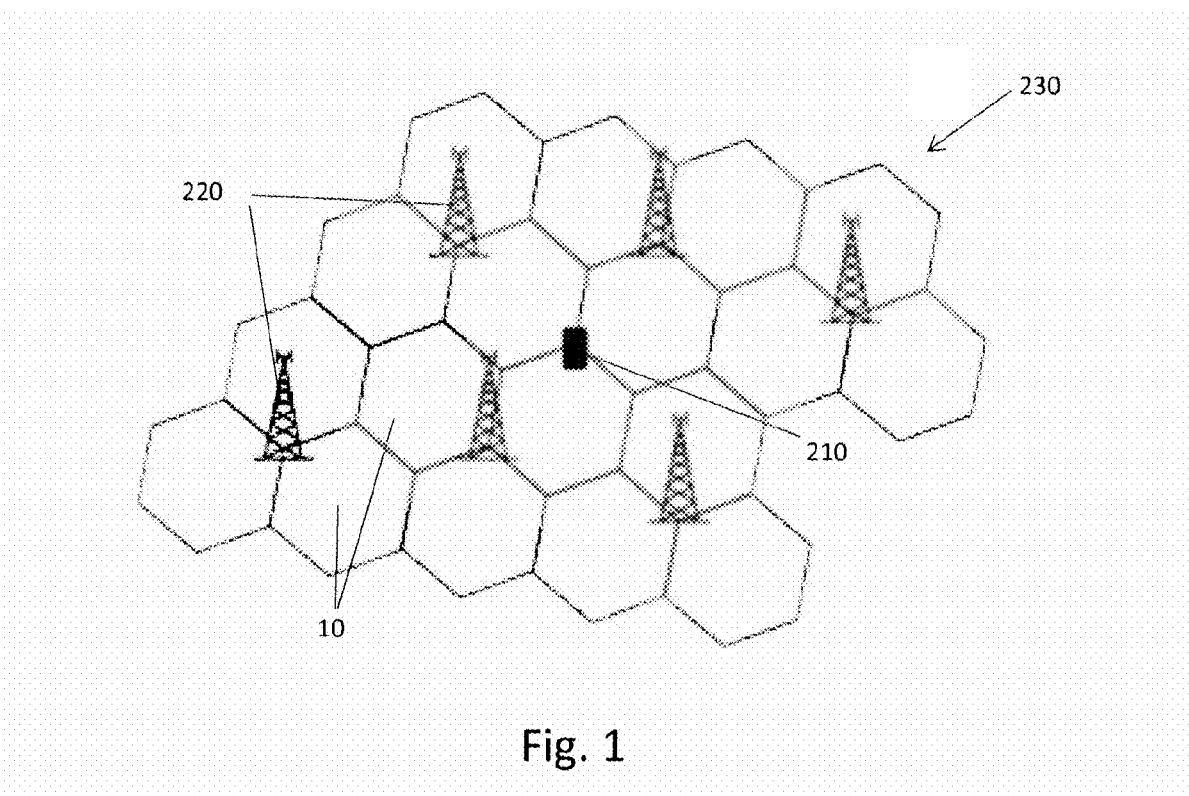
FIG. 1 illustrates an example of a wireless communication system.
Figure 2:
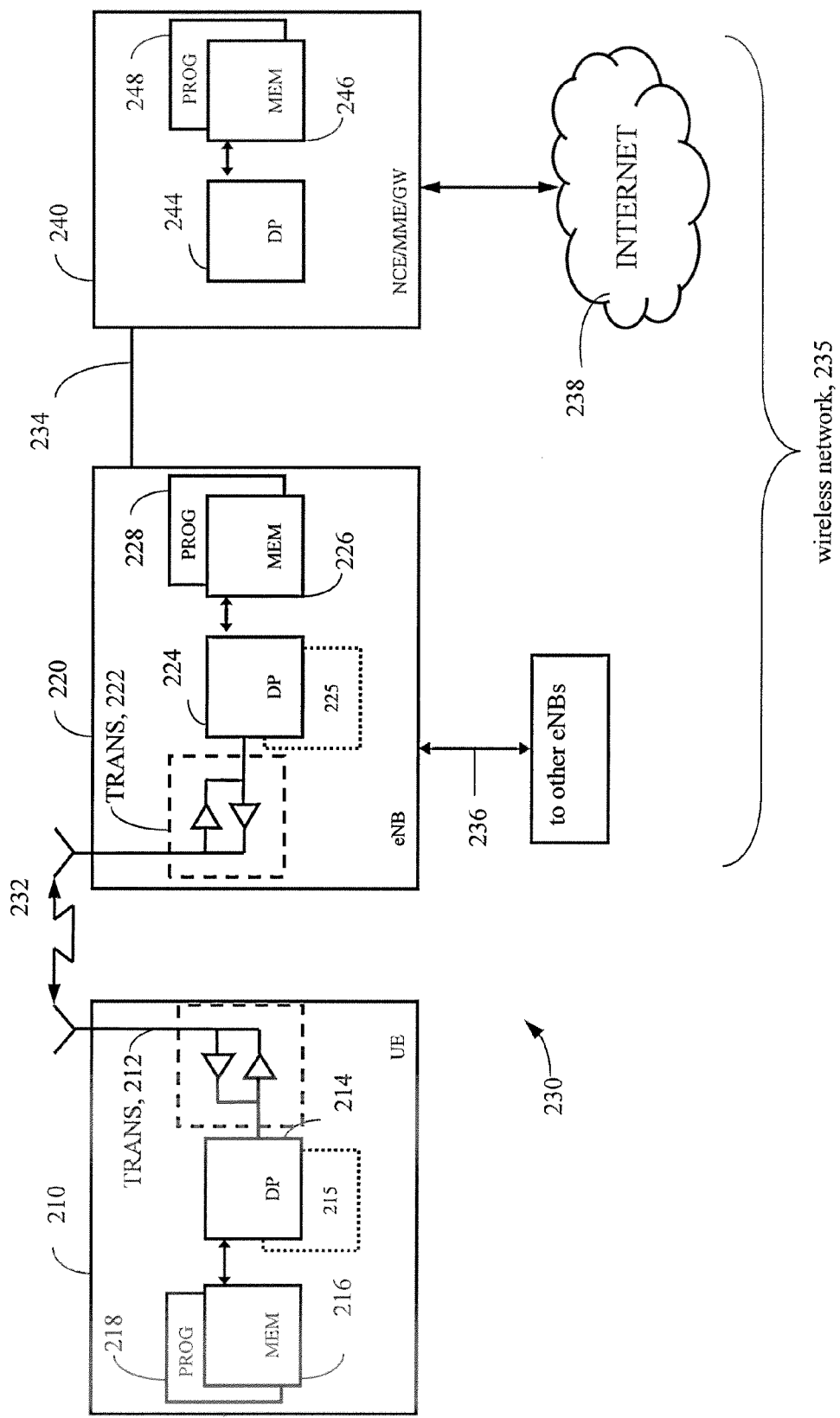
FIG. 2 illustrates an example of communications between a wireless network and a user equipment.

The following abbreviations that may be found in the specification and/or the drawing figures are defined as follows:

3GPP third generation partnership project
BSR buffer status report
BW bandwidth
CQI channel quality indicator
CRC cyclic redundancy code
dB decibels
DCI downlink control information
DL downlink (eNB towards UE)
DRX discontinuous reception
DTX discontinuous transmission
eNB E-UTRAN Node B (evolved Node B)
EPC evolved packet core
E-UTRAN evolved UTRAN (LTE)
FDD frequency division duplex
FDMA frequency division multiple access
HetNet Heterogenous Networks
HO Handover
LTE long term evolution
MAC medium access control
MBSFN multicast/broadcast single frequency network
MM/MME mobility management/mobility management entity
Node B base station
O&M operations and maintenance
OFDMA orthogonal frequency division multiple access
PDCCH physical downlink control channel
PDCP packet data convergence protocol
PDSCH physical downlink shared channel
PHY physical
PMI precoding matrix index
PUSCH physical uplink shared channel
RACH random access channel
RAN Radio Access Network
Rel-12 Release 12
RI rank information
RLC radio link control
RLF Radio Link Failure
RP RAN Plenary
RRC radio resource control
RSRP Reference symbol received power
RSRQ Reference symbol received quality
SC-FDMA single carrier, frequency division multiple access
SGW serving gateway
SR scheduling request
TA timing advance
TDD time division duplex
UE user equipment
UL uplink (UE towards eNB)
UTRAN universal terrestrial radio access network
WI Work Item
WID Work Item Description Referring to FIG. 1, a wireless communication system 230 may comprise communication stations 220 which form cells 10. Some of the cells 10 overlap one another. The user equipment (UE) 210 may move in and out of the various cells as the UE 210 travels. Referring also to FIG. 2, in the wireless system 230 a wireless network 235 is adapted for communication over a wireless link 232 with an apparatus, such as a mobile communication device which may be referred to as a UE 210, via a network access node, such as a Node B (base station), and more specifically an eNB 220. The network 235 may include a network control element (NCE) 240 that may include MME/S GW functionality, and which provides connectivity with a network, such as a telephone network and/or a data communications network (e.g., the internet 238).

The UE 210 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 210 via one or more antennas. The eNB 220 is coupled via a data/control path 234 to the NCE 240. The path 234 may be implemented as an interface. The eNB 220 may also be coupled to another eNB via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 210; by the DP 224 of the eNB 220; and/or by the DP 244 of the NCE 240, or by hardware, or by a combination of software and hardware (and firmware).

For the purposes of describing various exemplary embodiments in accordance with this invention the UE 210 and the eNB 220 may also include dedicated processors, for example RRC module 215 and a corresponding RRC module 225. RRC module 215 and RRC module 225 may be constructed so as to operate in accordance with various exemplary embodiments in accordance with this invention.

In general, the various embodiments of the UE 210 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Features as described herein may be used with Long Term Evolution (LTE) and Heterogenous Networks (HetNet) mobility enhancement for LTE Rel-12 WI [WID: RP-122007]. Features as described herein may be used to provide improvements to help with recovery from Radio Link Failure (RLF) to help improve the overall mobility robustness of HetNet and LTE networks.

A network may signal a User Equipment (UE) a list of cells that are prepared for re-establishment (i.e. have UE context). When a connection failure occurs, such as a Radio Link Failure (RLF) for example, the UE 210 may attempt re-establishment to one of the prepared cells. This is described in R2-132846 "Re-establishment Enhancements for HetNet"; by NSN, Nokia Corporation, 3GPP TSG-RAN WG2 Meeting #83, Barcelona, Spain 19-23 Aug. 2013 which is attached hereto as Exhibit A and hereby incorporated by reference in its entirety.

In the HetNet mobility Work Item (WI) there are different approaches for improving mobility robustness in HetNet deployments. A first approach is to trigger early enough outbound handovers (HOs) (especially from pico cells) in order to avoid RLFs. There are several proposed ways to accomplish this and obtain significant robustness improvements. Another approach is to improve the connection re-establishment so that recovery from RLF is faster/easier. Features as described herein propose a solution for the latter approach, i.e. enhancement for RRC connection re-establishment.

Figure 3:
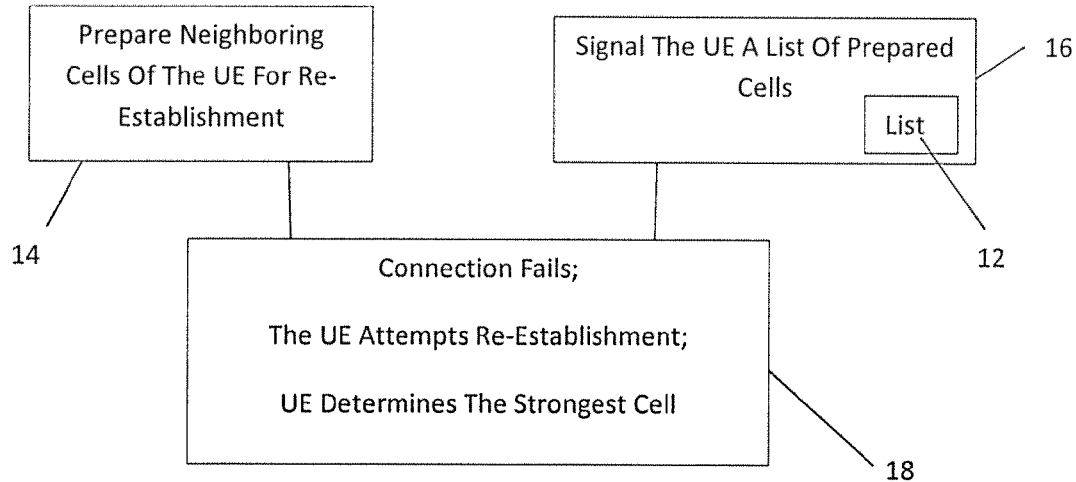
FIG. 3 illustrates an example of network and a user equipment preparing for and performing connection re-establishment.
Figure 4:
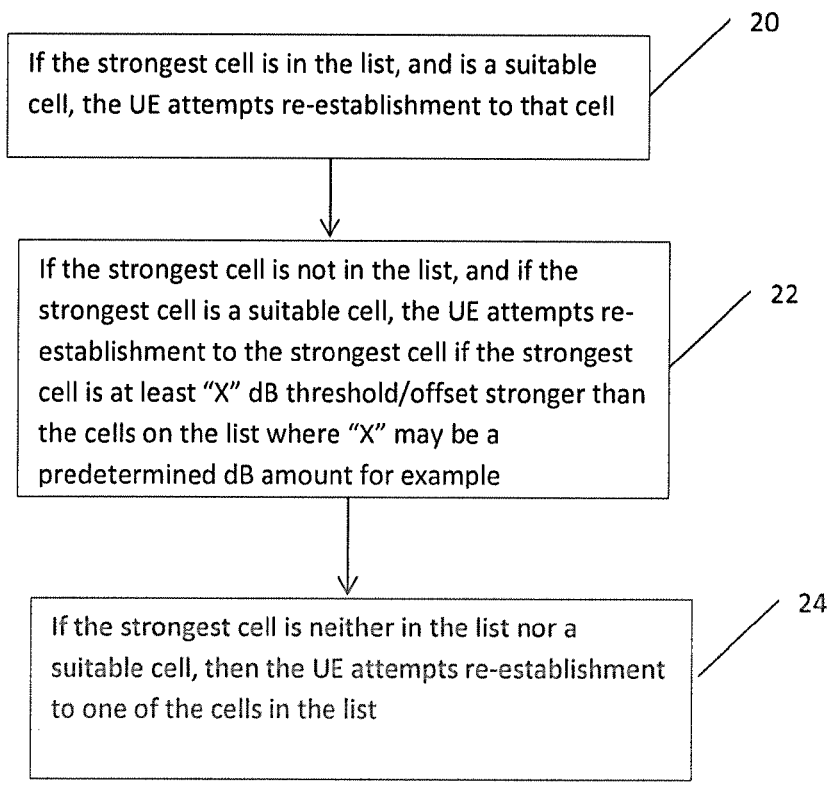
FIG. 4 illustrates an example of a procedure of connection re-establishment.

Referring also to FIG. 3, as indicated by block 14 the network may prepare neighboring cells 10 of the UE 210 for re-establishment (by sending UE context, which contains information needed for RRC connection re-establishment) and, as indicated by block 16, signal the UE 210 a list 12 of prepared cells. With features as described herein, when the connection fails (RLF is triggered, handover failure, RLC unrecoverable error, reconfiguration compliance failure for example) and the UE is to attempt re-establishment, the UE may determine the strongest cell (based on measurements) as indicated by block 18. Referring also to FIG. 4, the UE 210 may use the following procedure:

If the strongest cell is in the list 12, and is a suitable cell, the UE attempts re-establishment to that cell as indicated by block 20.

If the strongest cell is not in the list, and if the strongest cell is a suitable cell, the UE attempts re-establishment to the strongest cell if the strongest cell is at least a threshold amount stronger than the cells on the list, such as at least "X" dB stronger than the cells on the list, where "X" may be a predetermined dB amount for example, as indicated by block 22.

If the strongest cell is neither in the list nor a suitable cell, then the UE attempts re-establishment to one of the cells in the list, and does not attempt to re-establish to the strongest cell, as indicated by block 24.

A suitable cell may be a cell for which the measured cell attributes satisfy the cell selection criteria such as, for example, the cell PLMN (Public Land Mobile Network) is the selected PLMN, registered or an equivalent PLMN; the cell is not barred or reserved and the cell is not part of a tracking area which is in the list of "forbidden tracking areas for roaming". Thus, a "suitable cell" may be a cell on which the UE may camp on to obtain normal service, such as defined in TS36.304 for example). For example, this means that the cell is not barred, the cell is part of at least one TA (tracking area) that is not forbidden, the cell selection criteria (S criterion) are fulfilled, and the UE is a member of the CSG (if it is a CSG cell).

In an alternative example, the UE may attempt re-establishment to a cell on the list signaled by the network, unless there is another cell on the same carrier that is at least "X" dB stronger. Thus, the UE will not attempt re-establishment to a cell if, on a same carrier, there is another at least "X" dB stronger cell. If none of the cells in the list fulfill this condition, then the UE attempts re-establishment to the strongest cell it has detected/stored.

The threshold ("X" dB) for going for the best/strongest cell (in terms of signal strength or quality, RSRP or RSRQ or the like) instead of the cells known to be prepared may be configured by the network, or may be fixed by the specification (e.g. taking into account limited measurement accuracy, and/or typical HO margins).

The threshold ("X" dB) may, for example, be signaled to the UE using RRC signaling. This may be signaled using dedicated signaling or broadcast in system information for example. As an example, it could be given as an offset/threshold that the UE is to apply when evaluating the cells selection criterion S in the case of connection re-establishment. This offset could apply to the cells signaled to the UE (e.g. a list of prepared cells), or the cells otherwise considered by the UE as likely prepared cells (e.g. strongest cell on a carrier that the UE has reported within a predetermined or certain time, such as last 5 seconds for example). In some example embodiments, the cell selection for connection re-establishment can then happen as in the current specification except that quality (RSRQ) or signal level (RSRP) of the cells on the list may be modified by a given offset. Multiple offsets may also be configured, such as different offsets for RSRP and for RSRQ for example, or different offsets for different carriers.

In some example embodiments, the threshold ("X" dB) may also be determined autonomously by the UE.

In some example embodiments, the UE uses previously stored information of carriers and cells it has detected and measured to determine the strongest cell so that it can avoid additional searching and measuring to determine the strongest cell.

In an alternative example embodiment, when the connection fails (such as RLF is triggered, handover failure, RLC unrecoverable error, reconfiguration compliance failure) and the UE is to attempt re-establishment, the UE may go through the list of prepared cells (e.g. in the order they are given in the list 12; or from strongest to weakest for example) and for each cell in the list:

The UE may determine the strongest cell (based on RSRP/RSRQ measurements for example) on the frequency/carrier of the cell in the list If the cell in the list is suitable, and at most X dB weaker than the strongest cell, then the UE may attempt re-establishment to that cell Otherwise, the UE may attempt re-establishment to the strongest cell.

In an alternative example embodiment, the UE may attempt re-establishment to a cell on the signaled list, unless there is another cell (detected/stored) on any carrier that is at least X dB stronger. If none of the cells in the list fulfill this, then the UE may attempt re-establishment to the strongest cell it has detected/stored.

In an alternative example embodiment, a different threshold ("X" dB) may be applied to cells on a same carrier than for same carrier frequency cells. For example for a same carrier the UE may be allowed to attempt re-establishment to at most a 2 dB weaker cell, but for another carrier it could be a 4 dB weaker cell (because there is no UL interference problem for example). The threshold could depend on the load on that particular carrier or interference conditions on a certain carrier. In another example embodiment the threshold may be carrier dependent.

In an alternative example embodiment, if the stronger cell is at least "X" dB stronger than the prepared cells in the list, the UE might not attempt re-establishment, but instead either:

go directly to IDLE and do cell selection normally or do directly cell selection by attempting establishment to the strongest detected/stored cell (this could be reasonable if the list is updated frequently, so that there is no reason to believe it is not up to date, unless perhaps if UE has just sent a measurement report).

In a case where the connection is rejected, the UE may go to IDLE and performs cell selection normally.

In another alternative example embodiment, the UE may attempt re-establishment to the strongest cell it has reported recently (such as part of measurement reporting for example). For example, this may be within a specified/configured time period (e.g. 5 seconds or 1 second or some other time depending on DRX cycle) or simply in the previous measurement report (or multiple N previous measurement reports). In this alternative, the list of prepared cells might not be signaled from the network to the UE. In a further alternative, the UE may attempt re-establishment to the strongest reported cell unless there is another cell that is more than X dB stronger. The idea is for the network to prepare the cells that UE reports to be the strongest. But this is in a best effort manner, such that that the UE is not signaled these, but it can just assume it is done. In some example embodiments the cell(s) which the UE has reported may be considered to be a list of cells for which the UE applies different evaluation in the cell selection (such as applying an additional offset for example). Rules may be used to identify the cells for the list, such as cells which the UE has reported within a predetermined or otherwise determined time period. For example the period of time may be within the last the 5 seconds.

In an alternative example embodiment, the UE may attempt connection re-establishment to the strongest cell it has detected, but may apply an offset ("X" dB) when determining strength of those cells that are included in a list of cells (e.g. prepared cells, or cells having UE context, or otherwise favored cells by the network) signaled to the UE or is a cell that has been reported by the UE within a predetermined time (e.g. 5 seconds). In some example embodiments, the UE may apply the offset ("X" dB) only to a cell that is the strongest cell (such as with the highest RSRP or RSRQ for example) it has reported for a carrier (or measurement object) within the predetermined time.

In an alternative example embodiment, the UE may perform cell selection (as part of connection re-establishment) so that in a carrier (such as a EUTRA carrier for example) the UE considers only the strongest cell. When determining the strongest cell the UE may apply an offset ("X" dB) to those cells signaled to the UE by the network (e.g. prepared cells, or cells having UE context, or otherwise favored cells by the network) or is a cell that has been reported by the UE within a predetermined time (such as 5 seconds for example). In some example embodiments, the UE may apply the offset ("X" dB) only to a cell that is the strongest cell (such as with the highest RSRP or RSRQ for example) which has been reported for a carrier (or measurement object) within the predetermined time. With features as described herein the UE may apply an offset in cell selection for the prepared cells.

With features as described herein, success rate of the UE's re-establishment attempts goes up. This is because the UE knows which cells are prepared. This success rate will be better than current LTE specifications. With features as described herein, attempting re-establishment to a cell that is clearly worse than the best available cell is avoided. As a result the UE gets better quality of service and also avoids causing severe UL interference to a stronger cell.

Figures 5A, 5B:
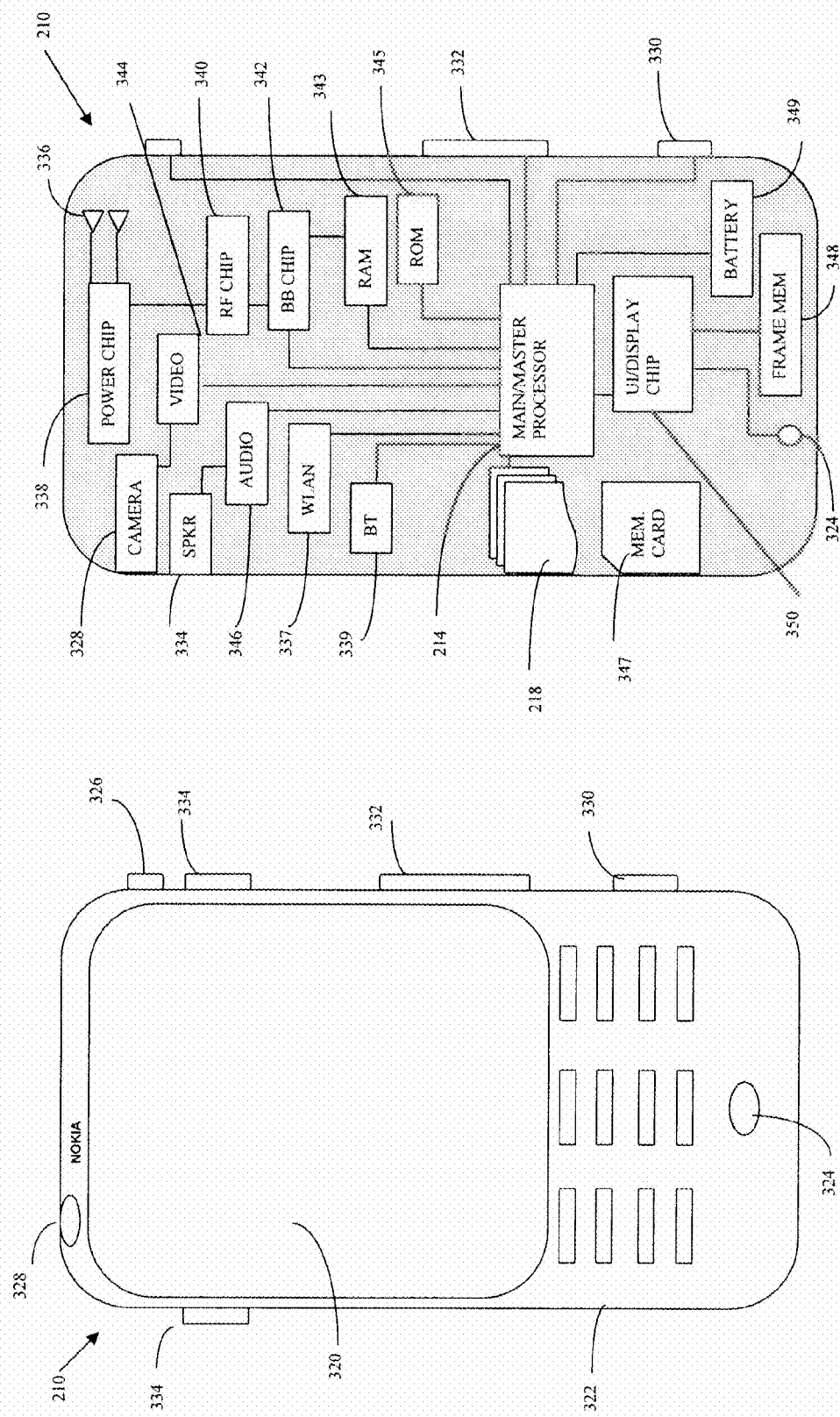
FIG. 5A and FIG. 5B illustrates an example of connection re-establishment embodied in one or some combination of the function-specific components, for example a user equipment.

FIGS. 5A and 5B illustrates further detail of an exemplary UE in both plan view FIG. 5A and sectional view FIG. 5B, and the invention may be embodied in one or some combination of those more function-specific components. In this example the UE 210 has a graphical display interface 320 and a user interface 322 illustrated as a keypad but understood as also encompassing touch-screen technology at the graphical display interface 320 and voice-recognition technology received at the microphone 324. A power actuator 326 controls the device being turned on and off by the user. The exemplary UE 210 may have a camera 328 which is shown as being forward facing (e.g., for video calls) but may alternatively or additionally be rearward facing (e.g., for capturing images and video for local storage). The camera 328 is controlled by a shutter actuator 330 and optionally by a zoom actuator 332 which may alternatively function as a volume adjustment for the speaker(s) 334 when the camera 328 is not in an active mode.

Within the sectional view of FIG. 5B are seen multiple transmit/receive antennas 336 that are typically used for cellular communication. The antennas 336 may be multiband for use with other radios in the UE. The operable ground plane for the antennas 336 is shown by shading as spanning the entire space enclosed by the UE housing though in some embodiments the ground plane may be limited to a smaller area, such as disposed on a printed wiring board on which the power chip 338 is formed. The power chip 338 controls power amplification on the channels being transmitted and/or across the antennas that transmit simultaneously where spatial diversity is used, and amplifies the received signals. The power chip 338 outputs the amplified received signal to the radio-frequency (RF) chip 340 which demodulates and downconverts the signal for baseband processing. The baseband (BB) chip 342 detects the signal which is then converted to a bit-stream and finally decoded. Similar processing occurs in reverse for signals generated in the apparatus 210 and transmitted from it.

Signals to and from the camera 328 pass through an image/video processor 344 which encodes and decodes the various image frames. A separate audio processor 346 may also be present controlling signals to and from the speakers 334 and the microphone 324. The graphical display interface 320 is refreshed from a frame memory 348 as controlled by a user interface chip 350 which may process signals to and from the display interface 320 and/or additionally process user inputs from the keypad 322 and elsewhere.

Certain embodiments of the UE 210 may also include one or more secondary radios such as a wireless local area network radio WLAN 337 and a Bluetooth® radio 339, which may incorporate an antenna on-chip or be coupled to an off-chip antenna. Throughout the apparatus are various memories such as random access memory RAM 343, read only memory ROM 345, and in some embodiments removable memory such as the illustrated memory card 347. The various programs 218 are stored in one or more of these memories. All of these components within the UE 210 are normally powered by a portable power supply such as a battery 349.

Processors 338, 340, 342, 344, 346, 350, if embodied as separate entities in a UE 210 or eNB 220, may operate in a slave relationship to the main processor 214, 224, which may then be in a master relationship to them. Embodiments of this invention are most relevant to the RRC module 215 and RRC module 225, though it is noted that other embodiments need not be disposed there but may be disposed across various chips and memories as shown or disposed within another processor that combines some of the functions described above. Any or all of these various processors access one or more of the various memories, which may be on-chip with the processor or separate therefrom. Similar function-specific components that are directed toward communications over a network broader than a piconet (e.g., components 336, 338, 340, 342-345 and 347) may also be disposed in exemplary embodiments of the access node 220, which may have an array of tower-mounted antennas rather than the two shown.

Note that the various chips (e.g., 338, 340, 342, etc.) that were described above may be combined into a fewer number than described and, in a most compact case, may all be embodied physically within a single chip.

Any combination of one or more computer readable medium(s) may be utilized as the memory for storing the software. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example method may comprise determining a strongest signal strength cell to a user equipment; and comparing the strongest cell to a list of prepared cells. The method may further comprise determining if the strongest cell is a suitable cell. The method may further comprise upon a connection failure, the user equipment attempting re-establishment to the strongest cell. The method may further comprise, if the strongest cell is not on the list, comparing the signal strength of the strongest cell to a threshold signal strength.

An example method may comprise comparing a first cell to a list of prepared cells by a user equipment, where the user equipment is connected to a wireless communications system having the first cell; when the first cell is on the list, and when there is a communications failure between the user equipment and the wireless communications system, re-establishing connection of the user equipment via the first cell unless there is a second cell on a same carrier which has a stronger signal strength with the user equipment than the first cell by at least a threshold value.

An example method may comprise comparing a plurality of cells to a list of prepared cells by a user equipment, where the user equipment is connected to a wireless communications system having the cells; determining a strongest signal strength cell to a user equipment; determining if one or more of the plurality of cells is a suitable cell; determining if a suitable one of the cells has a signal strength which is weaker than the signal strength of the strongest signal strength cell by a threshold amount.

An example method may comprise comparing, by a user equipment, a plurality of first cells to a list of prepared cells, where the user equipment is connected to a wireless communications system having the cells; comparing signal strength to the user equipment of at least one of the first cells and at least one second cell; and when there is a communications failure between the user equipment and the wireless communications system, attempting re-establishment by the user equipment with a selected one of the first cells unless the signal strength of the at least one second cell is stronger relative to the selected first cell by at least a threshold value.

An example apparatus may comprise at least one processor; and at least one non-transitory memory including computer program code, the at least one memory and the computer program code configured to, with the at least one processor, cause the apparatus to perform any of the methods described above.

An example non-transitory program storage device readable by a machine may be provided, tangibly embodying a program of instructions executable by the machine for performing operations, the operations comprising any of the methods described above.

The apparatus may comprise means for performing any of the methods described above, such as at least one processor and at least one memory comprising software. The means may comprise any of the components shown in FIGS. 5A-5B for example. The method may comprise means for performing any of the method steps described above.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one data processor; and
   at least one non-transitory memory including computer program code, where the at least one non-transitory memory and computer program code are configured, with the at least one data processor, to cause the apparatus at least to:
   determine a strongest signal strength cell to a user equipment;
   compare the strongest signal strength cell to a list of prepared cells, where the prepared cells are cells that are prepared for connection re-establishment;
   determine if the strongest signal strength cell is a suitable cell;
   determine if the strongest signal strength cell is on the list of prepared cells; and
   upon a connection failure, compare the signal strength of the strongest signal strength cell to a threshold signal strength, if the strongest cell is a suitable cell but is not on the list of prepared cells.

2. The apparatus as in claim 1, in which the at least one non-transitory memory and computer program code are further configured with the at least one data processor to further cause the apparatus, upon a connection failure, to attempt re-establishment of connection between the user equipment and the strongest signal strength cell if the strongest signal strength cell is a suitable cell and is on the list of prepared cells.

3. The apparatus as in claim 1, in which the at least one non-transitory memory and computer program code are further configured with the at least one data processor to further cause the apparatus to attempt re-establishment of connection between the user equipment and the strongest signal strength cell, if the strongest signal strength cell is at least a threshold amount stronger than the cells on the list of prepared cells.

4. The apparatus as in claim 1, in which the at least one non-transitory memory and computer program code are further configured with the at least one data processor to further cause the apparatus to attempt re-establishment of connection between the user equipment and one of the cells in the list of prepared cells, if the strongest signal strength cell is neither in the list of prepared cells nor a suitable cell.

5. The apparatus as in claim 1, wherein the strongest signal strength cell is determined based on at least one of signal strength, signal quality, reference symbol received power or reference symbol received quality.

6. A method comprising:
   determining a strongest signal strength cell to a user equipment;
   comparing the strongest signal strength cell to a list of prepared cells, where the prepared cells are cells that are prepared for connection re-establishment;
   determining if the strongest signal strength cell is a suitable cell;
   determining if the strongest signal strength cell is on the list of prepared cells; and
   upon a connection failure, comparing the signal strength of the strongest signal strength cell to a threshold signal strength, if the strongest cell is a suitable cell but is not on the list of prepared cells.

7. A method as in claim 6, further comprising, upon a connection failure, the user equipment attempting re-establishment of connection between the user equipment and the strongest signal strength cell if the strongest signal strength cell is a suitable cell and is on the list of prepared cells.

8. A method as in claim 6, further comprising attempting re-establishment of connection between the user equipment and the strongest signal strength cell, if the strongest signal strength cell is at least a threshold amount stronger than the cells on the list of prepared cells.

9. A method as in claim 6, further comprising attempting re-establishment of connection between the user equipment and one of the cells in the list of prepared cells, if the strongest signal strength cell is neither in the list of prepared cells nor a suitable cell.

10. A method as in claim 6, wherein the strongest signal strength cell is determined based on at least one of signal strength, signal quality, reference symbol received power or reference symbol received quality.

11. An apparatus, comprising:
    at least one data processor; and
    at least one non-transitory memory including computer program code, where the at least one non-transitory memory and computer program code are configured, with the at least one data processor, to cause the apparatus at least to
    compare a plurality of cells to a list of prepared cells, where the prepared cells are cells that are prepared for connection re-establishment and where a user equipment is connected to a wireless communications system having the cells;
    determine a strongest signal strength cell to the user equipment;
    determine if one or more of the plurality of cells is a suitable cell;
    determine if the suitable cell of the one or more of the plurality of cells has a signal strength which is weaker than the signal strength of the strongest signal strength cell; and
    attempt re-establishment of connection between the user equipment and the suitable cell of the one or more of the plurality of cells, if the suitable cell is on the list of prepared cells and if the suitable cell has a signal strength weaker than the signal strength of the strongest signal strength cell by at most a threshold amount.

12. The apparatus as in claim 11, in which the list of prepared cells is received from eNB.

13. The apparatus as in claim 11, wherein the strongest signal strength cell is determined based on at least one of signal strength, signal quality, reference symbol received power or reference symbol received quality.

14. An apparatus, comprising:
    at least one data processor; and
    at least one non-transitory memory including computer program code, where the at least one non-transitory memory and computer program code are configured, with the at least one data processor, to cause the apparatus at least to:

compare a plurality of cells to a list of prepared cells, where the prepared cells are cells that are prepared for connection re-establishment and where a user equipment is connected to a wireless communications system having the cells;

determine a strongest signal strength cell to the user equipment;

determine if one or more of the plurality of cells is a suitable cell;

determine if the suitable cell of the one or more of the plurality of cells has a signal strength which is weaker than the signal strength of the strongest signal strength cell; and attempt re-establishment of connection between the user equipment and the strongest signal strength cell, if the one or more of the plurality of cells is not a suitable cell or if the suitable cell of the one or more of the plurality of cells has a signal strength weaker than the signal strength of the strongest signal strength cell by more than a threshold amount.

15. The apparatus as in claim 14, in which the list of prepared cells is received from eNB.

16. The apparatus as in claim 14, in which the at least one non-transitory memory and computer program code are further configured with the at least one data processor to cause the apparatus to attempt re-establishment of connection between the user equipment and the strongest cell, if the strongest signal strength cell is determined within a recent configured time period.

17. The apparatus as in claim 16, in which the recent configured time period depends on DRX cycle.

18. The apparatus as in claim 14, wherein the strongest signal strength cell is determined based on at least one of signal strength, signal quality, reference symbol received power or reference symbol received quality.

19. An apparatus, comprising:

at least one data processor; and at least one non-transitory memory including computer program code, where the at least one non-transitory memory and computer program code are configured, with the at least one data processor, to cause the apparatus at least to compare a plurality of cells to a list of prepared cells, where the prepared cells are cells that are prepared for connection re-establishment and where a user equipment is connected to a wireless communications system having the cells;

determine a strongest signal strength cell to the user equipment;

determine if one or more of the plurality of cells is a suitable cell;

determine if the suitable cell of the one or more of the plurality of cells has a signal strength which is weaker than the signal strength of the strongest signal strength cell; and go to IDLE mode or perform cell selection normally, if the suitable cell of the one or more of the plurality of cells has a signal strength weaker than the signal strength of the strongest signal strength cell by more than a threshold amount.

20. The apparatus as in claim 19, wherein the strongest signal strength cell is determined based on at least one of signal strength, signal quality, reference symbol received power or reference symbol received quality.

* * * * *